United States Patent
Schemmann et al.

(10) Patent No.: US 8,260,138 B2
(45) Date of Patent: Sep. 4, 2012

(54) WAVELENGTH DISTRIBUTION FOR OPTICAL TRANSPORT

(75) Inventors: Marcel F. Schemmann, Marea Hoop (NL); Venk Mutalik, Middletown, CT (US)

(73) Assignee: ARRIS Solutions, Inc., Suwanee, GA (US)

( * ) Notice: Subject to any disclaimer, the term of this patent is extended or adjusted under 35 U.S.C. 154(b) by 630 days.

(21) Appl. No.: 12/420,049

(22) Filed: Apr. 7, 2009

(65) Prior Publication Data
US 2009/0290879 A1  Nov. 26, 2009

Related U.S. Application Data

(60) Provisional application No. 61/123,375, filed on Apr. 7, 2008.

(51) Int. Cl.
*H04J 14/02* (2006.01)
(52) U.S. Cl. ............. 398/79; 398/34; 398/91; 398/158; 398/159; 398/194
(58) Field of Classification Search .................. 398/79, 398/81, 140, 158, 159, 192, 194, 201; 385/24
See application file for complete search history.

(56) References Cited

U.S. PATENT DOCUMENTS

| | | | | | |
|---|---|---|---|---|---|
| 5,410,624 | A | * | 4/1995 | Morkel ........................... | 385/24 |
| 5,546,210 | A | * | 8/1996 | Chraplyvy et al. ............. | 398/79 |
| 6,118,563 | A | * | 9/2000 | Boskovic et al. ................. | 398/1 |
| 6,366,376 | B1 | * | 4/2002 | Miyata et al. .................... | 398/79 |
| 7,783,197 | B2 | * | 8/2010 | Litvin et al. .................... | 398/81 |
| 2005/0220397 | A1 | * | 10/2005 | Oikawa et al. .................. | 385/24 |

OTHER PUBLICATIONS

Suzuki et al: "22x10 Gb/s WDM Transmission Based on Extended Method of Unequally Spaced Channel Allocation Around the Zero-Dispersion Wavelength Region", IEEE Photon Technol. Lett, vol. 11, No. 12, Dec. 1999, pp. 1677-1679.*

Forghieri et al: "Repeaterless Transmission of Eight Channels at 10 Gb/s Over 137 km (11 Tb/s-km) of Dispersion Shifted Fiber Using Unequal Channel Spacing", IEEE Photon Technol. Lett, vol. 6, No. 11, Nov. 1994, pp. 1374-1376.*

* cited by examiner

*Primary Examiner* — Li Liu
(74) *Attorney, Agent, or Firm* — Troy A. Van Aacken; Robert J. Starr

(57) ABSTRACT

An optical communication system includes logic to communicate using optical channels set outside a fiber zero dispersion zone, and having channel spacing that decreases with increasing distance from the fiber zero dispersion zone.

22 Claims, 6 Drawing Sheets

WAVELENGTH DISTRIBUTION FOR OPTICAL TRANSPORT

PRIORITY

This application claims priority under 35 USC 119 to U.S. application Ser. No. 61/123,375 filed on Monday, Apr. 7, 2008, which is presently pending and which is incorporated herein by reference in its entirety.

BACKGROUND

Four wave mixing (FWM) in optical communication systems employing multiple carrier wavelengths may lead to beat products at optical frequencies $f_1 \pm f_2$, $f_1 \pm f_3$ and $f_1 \pm 2f_2$, where f1, f2, f3 are the optical frequencies of carriers in the wavelength plan that participate in creating these beat products. For more than three carriers any combination of 3 and 2 carriers participates in generating these beat products. When the beat products end up at the same optical frequency of any of the other optical frequencies in the channel plan, mixing of the carrier and beat product takes place such that unwanted noise and distortions are generated. Thus it is desirable to prevent the beat products from superimposing with the carriers.

Optical communication systems may also suffer from distortions and noise due to Stimulated Raman Scattering (SRS) and other fiber effects. Component heating and degradation over time may cause wavelength drift and other undesirable effects. It is desirable to reduce the effects of SRS and other distortions and noise while maintaining dense wavelength spacing and, if possible, backward compatibility with existing optical communication components.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Figure 1:
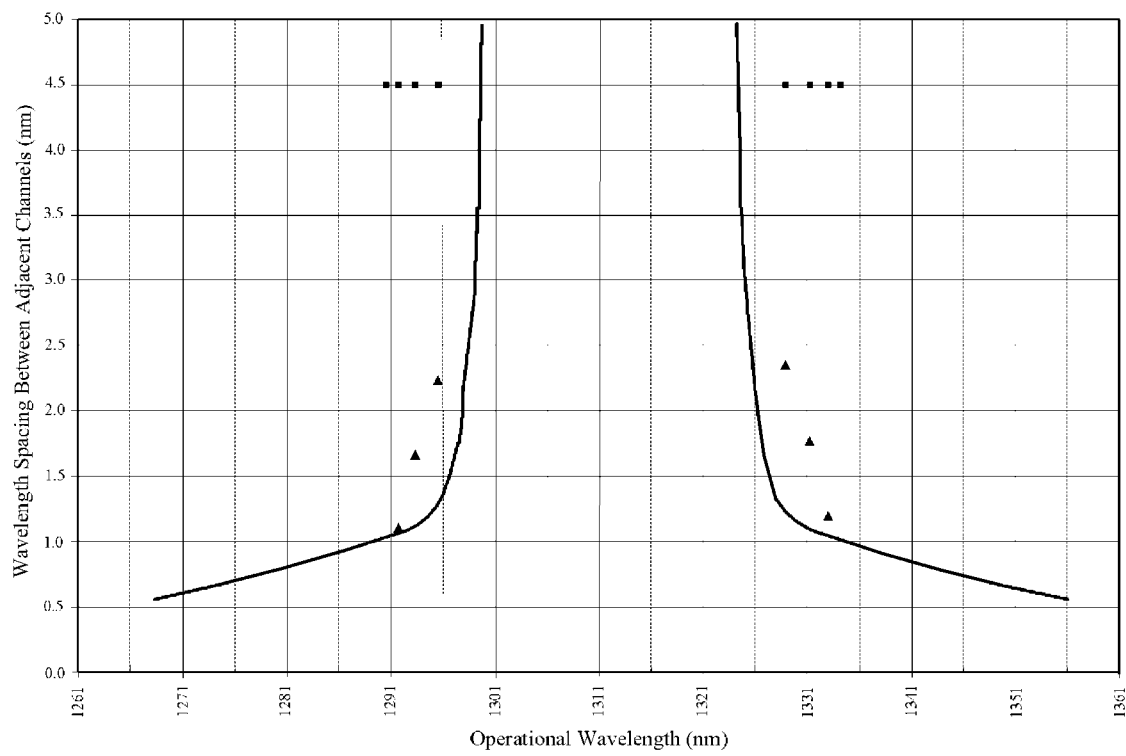
FIG. 1 is an illustration of a wavelength distribution plan in a WDM optical transport system.

References to "one embodiment" or "an embodiment" do not necessarily refer to the same embodiment, although they may.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list.

"Logic" refers to signals and/or information that may be applied to influence the operation of a device. Software, hardware, and firmware are examples of logic, which may be embodied in electrical or optical processing elements, both analog and/or digital in nature. Hardware logic may be embodied in circuits, either optical or electrical. In general, logic may comprise combinations of software, hardware, and/or firmware. As used herein, "logic" also refers to active and passive optical signal communication and signal processing components, such as lasers, splitters, combiners, multiplexers, demultiplexers, transmitter, receivers, and so on.

Those skilled in the art will appreciate that logic may be distributed throughout one or more devices, and/or may be comprised of combinations of instructions in memory, processing capability, circuits, and so on. Therefore, in the interest of clarity and correctness logic may not always be distinctly illustrated in drawings of devices and systems, although it is inherently present therein.

In a multi-wavelength system operating close to the zero dispersion point four-wave mixing may degrade system performance for narrow channel spacing. Four wave mixing may be of the ingress type or the egress type, and/or of the partially degenerate type or of the partially non-degenerate type (2f1−f2) or (f1+f2−f3). It is desirable to reduce 4WM of all types. For standard single mode fibers, 1300 nm through 1324 nm is the zone in which the zero dispersion point will be located. Four wave mixing produces beat products which will contribute to distortion when they superimpose with the optical carrier signals. Ingress four wave mixing may impact system CSO (Composite Second Order Distortion) and the egress 4WM may impact the CNR (Carrier to Noise Ratio) if the beats fall close to the carrier wavelengths.

Another source of distortion is Stimulated Raman Scattering (SRS). The optical channel spacing should be narrow to reduce the effect of SRS that may limit attainable system performance. SRS may impact optical crosstalk and the system CSO in optical transport systems.

Optical filters of the multiplexer or de-multiplexer type are often employed in multi-wavelength communication systems. Typically, these filters employ a flat IL profile and have sufficient isolation between the adjacent channels to prevent optical passive crosstalk. Therefore, some channel spacing is involved when using optical filters. The first derivative of the filter insertion loss is an indicator of the filter's relative flatness and is typically a factor in the design.

A wavelength plan may include tolerance for transmitter wavelength drift such that channel wavelengths do not superimpose with channel beat products. Superposition of transmitter wavelength and beat products may lead to mixing that deteriorate system CNR and distortion performance. Smaller channel spacing may reduce distortions and/or crosstalk due to channel power modulation as a result of FWM (Four Wave Mixing). The channel spacing may thus be made a function of the distance of the wavelengths to the zero dispersion point.

A wavelength plan may need to account for the drift of carriers and beats across the lifetime of the product. Tolerance for transmitter wavelength drift may be incorporated such that channel wavelengths do not superimpose with beat products as carriers drift over time. Channel spacing should also provide for reduced distortions or crosstalk due to channel power modulation as a result of FWM.

Optical transmitters may be linearized to account for residual fiber dispersion, optical filters and laser imperfections. Linearizations may be sequential or simultaneous, or combinations thereof. Linearizations may be accomplished at the transmitters or at the receivers, or and points along the fiber.

An optical channel plan for WDM optical transport should result in low channel spacing, reduced likelihood of distortion, and compatibility with existing optical transport systems and standards. The channel spacing to prevent or substantially reduce FWM distortions and crosstalk decreases with distance from the zero dispersion point, which for most commercial fiber lies somewhere within the zero dispersion zone of 1300-1324 nm. The channel spacing may thus be set largest at a wavelength closest to the zero dispersion zone, and may decrease with distance from the zero dispersion zone.

For example, in one implementation the minimum wavelength of the channel plan may be set above the highest zero dispersion point specified for SMF-28 fiber. In one implementation, the maximum wavelength of the channel plan may be set below the lowest zero dispersion point specified for SMF-28 fiber.

In some implementations, the channel spacing is uniformly decreased with distance from the zero dispersion zone. In other implementations, the spacing decreases non-uniformly with distance from the zero dispersion zone. When the spacing is decreased non-uniformly, the wavelength for a particular channel may be set according to one of the following formulas (depending on which side of the zero dispersion zone the wavelengths are selected for):

$$F_i = F_0 + i \cdot df + 0.5 \cdot i^2 \cdot \Delta f$$

$$F_i = F_0 - i \cdot df - 0.5 \cdot i^2 \cdot \Delta f$$

where $F_0$ is the first selected wavelength closest to the zero dispersion zone, i is the channel index, df is the base-channel spacing (spacing of the channel closest to the zero dispersion zone) and $\Delta f$ is the increase in channel spacing between every pair of adjacent wavelengths.

For example, the following four wavelength plan may be derived from the above formulas:

i $F_i$ Wavelength
1 232.3 THz 1290.54 nm
2 232.1 THz 1291.65 nm
3 231.8 THz 1293.32 nm
4 231.4 THz 1295.56 nm
Where:
$F_0$=232.4 THz
df=−0.05 THz
$\Delta f$=−0.1 THz The first wavelength may be set as close as possible to the boundary of the zero zone, possibly while also being centered on an ITU (International Telecommunication Union) grid value. Furthermore, all wavelengths of the channel plan may be set within one CWDM (Course Wave Division Multiplexing) band. This may provide compatibility with existing CWDM optical transport systems.

The ITU has defined standard channels and wavelengths for CWDM (G.695) and for DWDM (G.6xx) and for standard single mode optical fibers (G.652). Of these, the DWDM standard defines the 50 GHz or the 100 GHz grid but only in the C and the L band which typically restricts these to the 1550 nm band. For wavelength selection the 100 GHz spacing and the 50 GHz (or even potentially a future 25 GHz) spacing may be extended towards the 1270 to 1340 nm window.

FIG. 1 is an illustration of a wavelength plan in accordance with principles described herein. Four wavelengths are chosen below the zero dispersion region (1300-1324 nm) in the CWDM band comprising the approximate range of 1288-1296 nm. The wavelength spacing decreases with distance from the boundary of the zero dispersion zone. The wavelengths may be quantized to be centered on ITU grid values. Four wavelengths are also chosen above the zero dispersion region in the CWDM band comprising the approximate range of 1328-1335 nm. The wavelength spacing decreases with distance from the boundary of the zero dispersion zone. The wavelengths may be quantized to be centered on ITU grid values. The rectangles represent wavelength values selected for CWDM communications. The triangles represent spacing between the selected wavelengths. In the zero dispersion region (1300-1324 nm) there is no wavelength spacing that is suitable (hence the graph quickly becomes asymptotic toward infinite spacing in and approaching this region).

In some implementations the channel plan may include wavelengths below the zero dispersion band, with spacing and values selected as described herein. Some implementations may include wavelengths above the zero dispersion zone, with spacing and values selected as described herein, and some channel plans may include wavelengths both above and below the zero dispersion band.

In one implementation, the channel plan comprises four wavelengths, set and spaced in accordance with the principles described herein, with all channels below the zero dispersion zone. In one implementation, the channel plan comprises eight wavelengths, set and spaced in accordance with the principles described herein, with four channels below the zero dispersion zone and four above. In one implementation, the channel plan comprises twelve wavelengths, set and spaced in accordance with the principles described herein, with four channels below the zero dispersion zone and eight above. In one implementation, the channel plan comprises twelve wavelengths, set and spaced in accordance with the principles described herein, with eight channels below the zero dispersion zone and four above. In general, a channel plan may include N channels, with N typically greater than three (3).

In some implementation the channel spacing may increase uniformly as the distance to the zero dispersion point decreases. Uniform increase may provide for improved tolerance in transmitter wavelength spacing. For example, the spacing may be uniformly increased by 100 GHz, 50 GHz, or 25 GHz for each channel. The actual spacing between channels may, in some implementations, vary somewhat due to quantizing the actual wavelength values on ITU grid values for compatibility purposes. The entire channel plan may be fit within a single CWDM band, further enhancing compatibility with existing optical transport systems.

A DWDM (Dense Wave Division Multiplexing) wavelength plan may include wavelengths below the zero dispersion point of SMF-28 rated fiber. Such a wavelength plan may be employed to provide gigabit Ethernet service over wavelengths starting at 1470 nm. Such a DWDM wavelength plan may also be employed to provide service in the 1550 nm region (C- or L-band).

Figure 2:
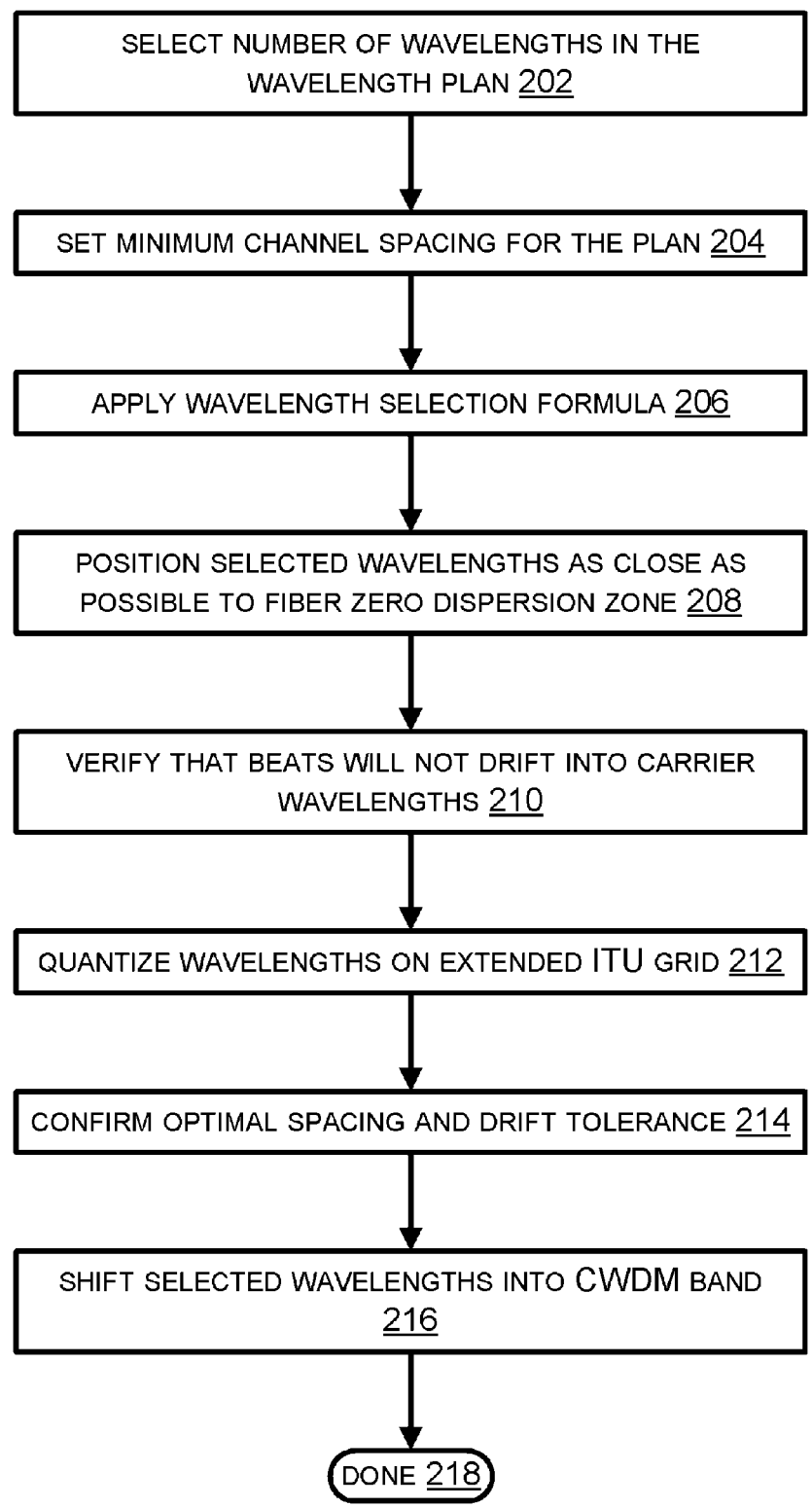
FIG. 2 is a flowchart of an embodiment of a wavelength selection process.

FIG. 2 is a flowchart of an embodiment of a wavelength selection process. At 202 a number of wavelengths for the wavelength plan are selected. A minimum channel spacing is chosen for the plan (204), for example this might be 1.1 nm for practical optical filters to provide adequate adjacent channel rejection. A formula such as one of those described herein is applied (206) to select the spacing for the other remaining wavelengths. The wavelengths are set as close as possible to the fiber zero dispersion zone (208). This helps ensure that the transmitters can be built with minimum fiber dispersion circuitry while also minimizing 4WM effects. It also helps ensure that the maximum spacing of wavelengths in the plan is minimized to reduce the effects of SRS.

At 210 it is verified that there is sufficient guard band in the wavelengths and channel spacing to ensure that beat products will not drift into carrier wavelengths as components age or environmental conditions change. For example, each beat generated by the plan should be at least 0.1 nm away from each of the carriers at all times to avoid 4WM ingress effects over the lifetime of the system. Each of the wavelengths is quantized on the Extended ITU grid (212) so that for example they are on the nearest 50 GHz or the 100 GHz ITU specified grid position in the wavelength region of interest. This "quantization" of the wavelengths may affect the maximum acceptable spacing and guard bands, so that optimal spacing and drift tolerance may need to be reconfirmed (214), for example by iterating the acts at 208 and 210. The wavelengths are shifted so that the entire plan is within a single CWDM band (216), which may cause inefficiency in the wavelength plan. However it may be advantageous to have these wavelengths to be in the CWDM band to accommodate and remain compatible with already-deployed field components. The process then concludes (218).

The process described in FIG. 2 may be used to set a wavelength plan in either the lower or the upper region around the dispersion zero zone. It may be advantageous to select the wavelengths in the lower region because this may provide for an additional 40 nm "buffer" that will allow other digital signals such as GbE to co-propagate or counter-propagate in the same fiber without unduly interfering with the analog signals. A wavelength plan generated in accordance with FIG. 2 may allow for practical filters, prevent ingress and egress 4WM effects, reduce complexity of dispersion compensation, reduce the effects of SRS, fit on the extended ITU Grid, and accommodates the ITU CWDM spectrum.

In one implementation the minimum channel spacing in the wavelength plan is 200 GHz. Due to the desirability of greater separation from the zero dispersion wavelength for narrower wavelength spacing, in some implementations the entire wavelength plan may be shifted further away from the zero dispersion wavelength in case a lower minimum spacing is chosen.

The design of optical filters becomes difficult at narrower spacing. Any of the optical carriers may be allowed to drift up to 0.1 nm from the original set point and even under this condition the minimum separation between any of the beat products and an optical carrier may remain at least 0.1 nm. If the minimum carrier spacing is reduced then also the requirements for transmitter wavelength stability (e.g. 0.1 nm worst case) may become more stringent.

For wavelengths further from the zero dispersion wavelength the distortion due to fiber dispersion laser chirp is worse, possibly giving rise to a need for more sophisticated linearization techniques. Thus in some implementations the wavelengths are not located close to the zero dispersion point while meeting the requirements of stability and low distortion.

Applying the techniques and principles described herein may results in a wavelength plan with wavelength spacing that meets a reasonable wavelength stability requirement, allows the use of practical optical filters and close to the zero dispersion wavelength. SRS generated distortions may scale according to $20*\log(f1-f2)$ in the wavelength range of interest, where f1 and f2 are the optical frequencies of any pair of carriers involved in the SRS process. A plan in accordance with the principles and techniques described herein may reduce the impact of SRS by minimizing the spread of the optical frequencies.

Optical filters may have an insertion loss (IL) is wavelength dependent. Due to modulation of the laser, the optical wavelength moves somewhat, as a result of which the IL in the transmission system may be modulated. This may cause distortions. Optical components may have different wavelength dependencies in regards to IL, meaning that transmitters may have to be tuned and matched to the optical filters that they will be used with in the field. This causes a logistical problem. In order to use any optical filter with any optical transmitter, the linearization process may be adapted such that by providing information about the filter wavelength dependence (that is the slope in dB/nm at the center wavelength) to the transmitter, the transmitter can then change its linearizer settings to cancel the filter distortion. As a result filters may be swapped in the field and by providing filter coefficients to the transmitter, the systems may continue to operate properly. The coefficients may be recovered from a database by providing (e.g. scanning) the serial number on the filters in the field. The database may be networked to the transmitters, and the filter coefficients provided thereby. The database may provide for ascertaining information about a customer's networks and topologies, for example by storing component associations (filters and transmitters) and by storing interactions with that database.

Transmitter wavelength stability is important in DWDM systems that may suffer from FWM degradation of performance. It may be desirable to maintain a 0.1 nm wavelength stability over the system life. A wavelength control loop may not rely on controlling laser thermistor temperature alone. In addition, the temperature difference between the laser chip at the active region emitting light and the thermistor mounted on the baseplate may be considered. Ambient temperature, which may result in heat leakage to and from a baseplate inside a cooled laser, resulting in temperature gradients on the baseplate, may also be considered. Finally the cooler power, related to the amount of heat that is pumped from the baseplate, may cause temperature gradients in the baseplate, and may also be considered. Thus in some implementations thermistor target temperature may be maintained as a function of:

Laser current
Ambient temperature
Cooler power

Controls may be applied so that temperature in the active region of the laser remains stable while these parameters vary. Furthermore a calibration scheme may be adopted for a DWDM system wherein wavelengths are checked on a regular basis. The laser wavelength may be controlled at a set temperature, whereby a control circuit controls a cooler/heater such that the sensor temperature $T_{set}$ (of a sensor mounted in the laser package) is maintained in accordance with:

$$T_{set}=T_{set}+A \cdot T_{board}+B \cdot I_{laser}+C \cdot I_{heater}$$

Where $T_{board}$ is a board temperature measured outside the laser, $I_{laser}$ is the operating current of the laser chip, and $I_{heater}$ is the current of the heater/cooler. A, B, and C are constants chosen to maintain temperature stability within the desired range.

Operated in this manner, the laser temperature control system may be better capable of handling rapidly varying (high slew rate) external temperatures (primarily affecting board temperature and cooler current) without unacceptable wavelength variation of the transmitters.

Optical wavelength stabilization may also be applied to the transmitters described herein. However, it may not be cost effective to apply wavelength stabilization to a single transmitter. When an array of transmitters is employed, an optical element with a repetitive transmission function (such as an FP etalon) may be employed to lock multiple transmitters. For a channel plan with wavelength spacing at integer multiples, such a device may be used to cost-effectively stabilize an array of lasers.

The techniques and principles described herein may be applied to dispersion shifted fibers (e.g. fibers with dispersion zones in the 1550 nm region) as well. For example, the formulas described for selecting wavelengths may still apply, where $F_0$, is shifted to 1550 nm and the same rules for choosing minimum channel spacing as a function of spacing to the fiber zero dispersion wavelength apply.

The wavelength plans described herein may be embodied in logic in one or more elements of an optical and/or electro-optical transport system (e.g. a Hybrid Fiber Coaxial Cable Network).

Figure 3:
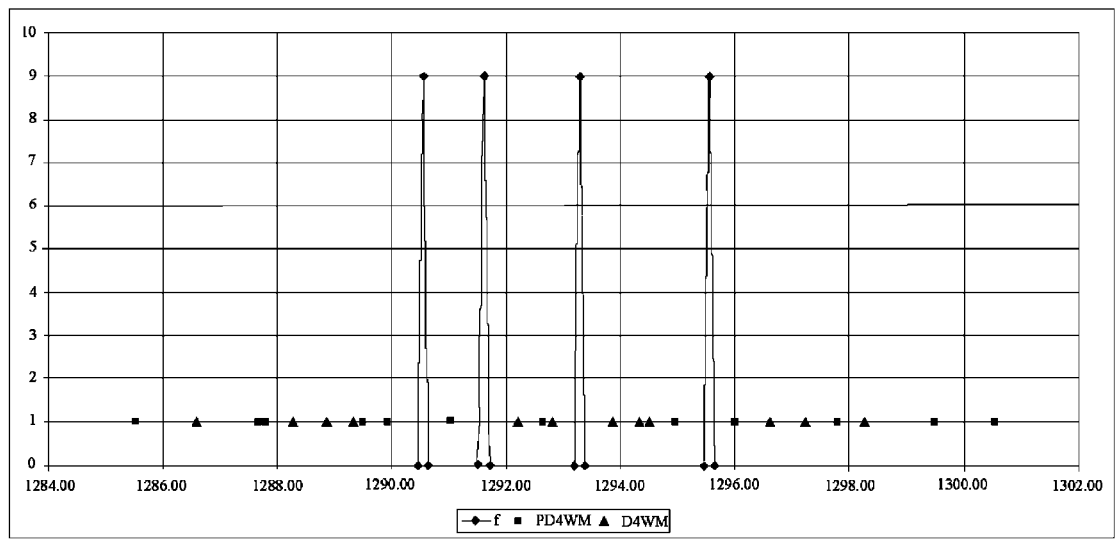
FIGS. 3 and 4 are chart illustrations of an embodiment of a wavelength plan for CDWM systems.
Figure 4:
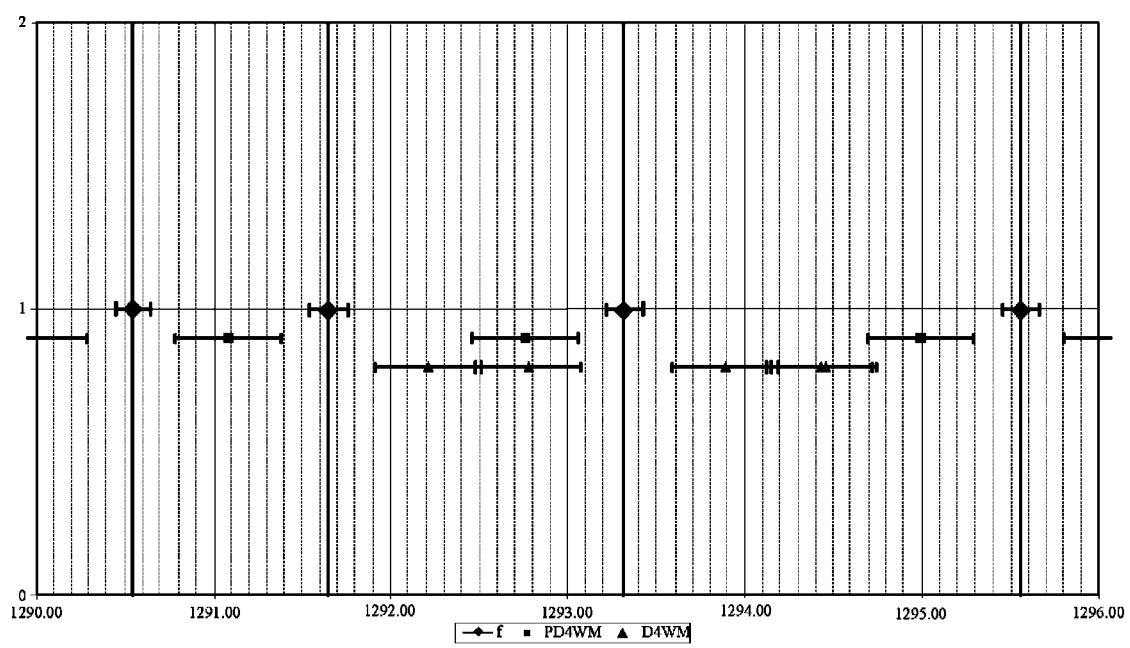

FIGS. 3 and 4 are chart illustrations of an embodiment of a wavelength plan for CDWM systems. The diamonds represent selected carrier (wavelength) values for the plan, and the bars around the diamonds indicate potential drift error (range) in the carriers. Triangles illustrate non-degenerate beat products of the selected wavelengths and the bars around these are the potential range of the beat products as the carriers drift. Squares illustrate partially degenerate beat products, with bars showing the potential drift. The embodiment of FIG. 3 shows a plan with four selected wavelengths below the zero dispersion band of a fiber. Other embodiments may include additional wavelengths below the zero dispersion band, and/ or wavelengths above the zero dispersion band. The four wavelengths are show with their partially degenerate and degenerate beats. None of the beats fall on the carriers. The selected wavelength plan embodiment illustrated by these figures may prevent overlap of carriers and beats, even if the carriers drift somewhat.

Figure 5:
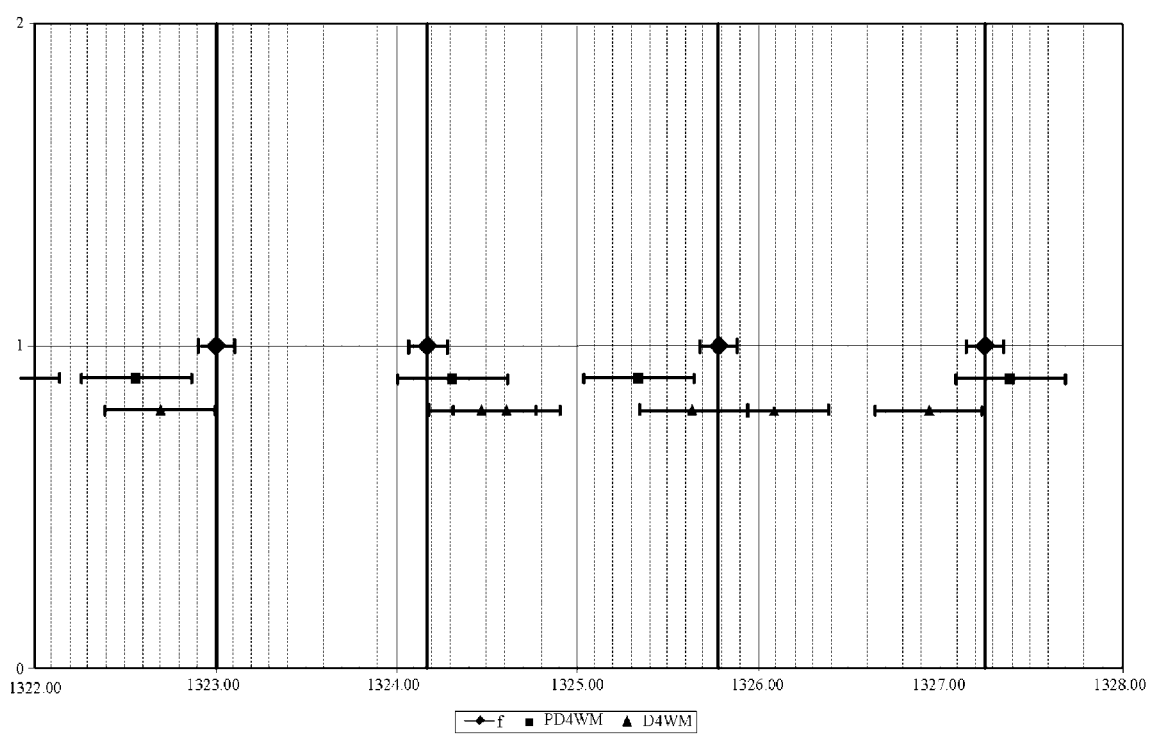
FIG. 5 is a chart illustration of an embodiment of a wavelength plan for CDWM systems in which one or more carriers has drifted by +/−0.1 nm.

FIG. 5 is a chart illustration of an embodiment of a wavelength plan for CDWM systems in which one or more carriers has drifted by +/−0.1 nm. In this plan the carriers are not as well selected as for the plans of FIGS. 3 and 4. Notice that the beats now overlap with the carrier as the carrier drifts by +/−0.1 nm.

Figure 6:
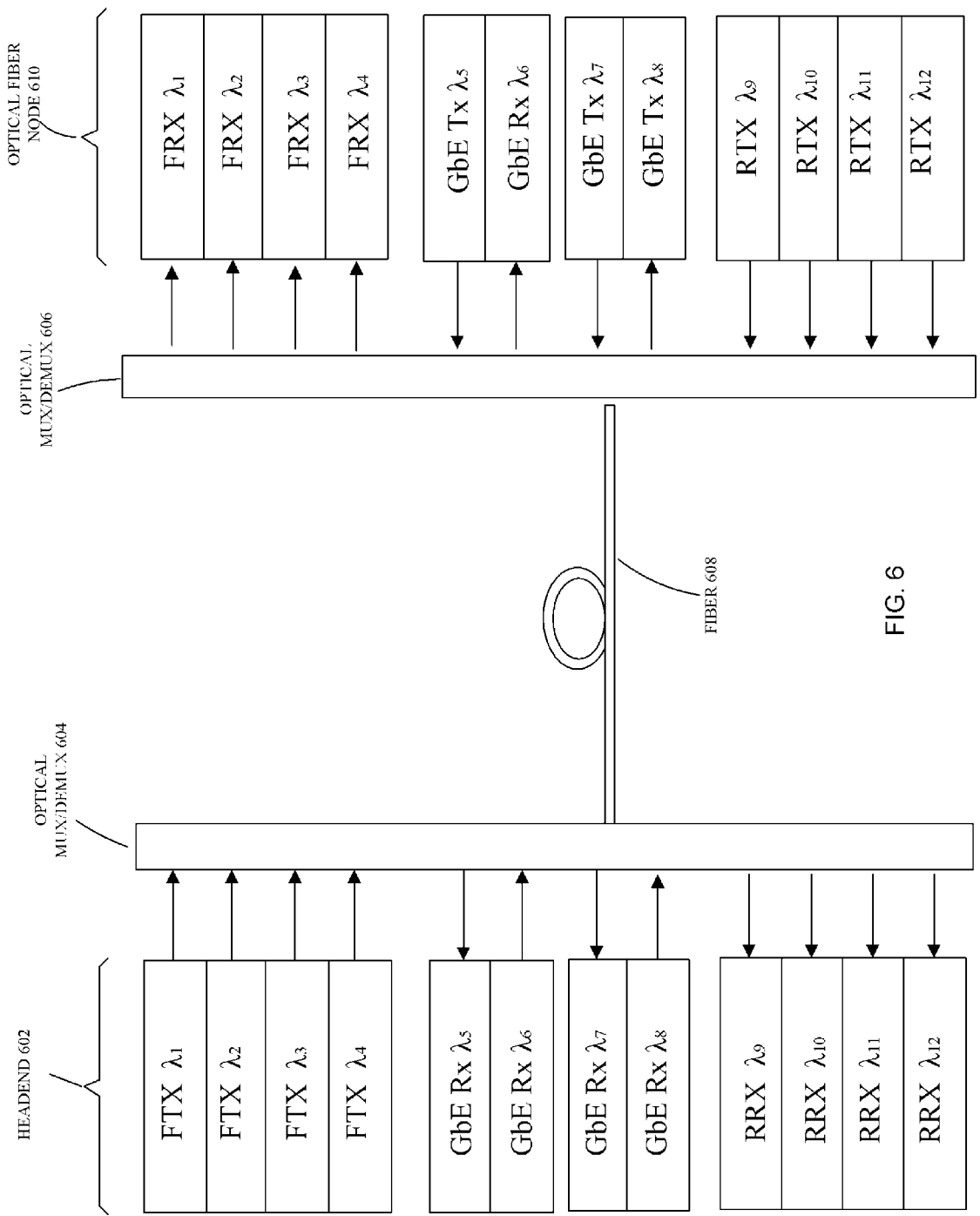
FIG. 6 is a block diagram illustration of an embodiment of a transmitter and system to implement a wavelength plan in accordance with the principles described herein.

FIG. 6 is a block diagram illustration of an embodiment of a transmitter and system to implement a wavelength plan in accordance with the principles described herein. A transmitter and/or receiver combination FTX-RRX in a head-end 602 comprises, in this embodiment, four transmitters of optical information in a forward (e.g. downstream) optical network direction and four transmitters/receivers of optical information in a reverse (e.g. upstream) network communication direction. Some systems may further comprise Gigabit Ethernet (GbE) transmitters and receivers for data communications in both the forward and reverse directions.

The forward transmitters FTS of the headend system 602 communicate on four forward wavelengths. The wavelengths may be selected and spaced, for example below the fiber zero dispersion region, in accordance with the principles described herein. The head-end transmitter/receiver combination 602 may further comprise Gigabit Ethernet forward transmitters, two of them in this embodiment, and Gigabit Ethernet receivers, also two of them in this embodiment, having wavelengths either below or above the fiber zero dispersion region (or possibly both), the wavelengths selected and spaced in accordance with the principles described herein.

The head-end transmitter/receiver combination 602 may further comprise reverse receivers RRX to receive upstream optical communications having wavelengths selected either above or below the fiber zero dispersion region, and valued and spaced in accordance with the principles described herein.

An optical multiplexer-demultiplexer 604 multiplexes signals from the forward transmitters FTX and Gigabit Ethernet transmitters GbE Tx in the forward direction and demultiplexes signals to the optical receivers RRX and Gigabit Ethernet receivers GbE Rx in the reverse direction. Signals in both the forward and reverse directions are communicated over an optical fiber 608 to and from optical multiplexer-demultiplexer 606. An optical fiber node transmitter/receiver combination 610 comprises forward receivers FRX at the wavelengths provided by the optical transmitters FTX. Likewise, the optical fiber node transmitter/receiver combination 610 may include Gigabit Ethernet transmitters and receivers GbE Tx and GbE Rx corresponding to similar components of head-end system 602.

The optical fiber node transmitter/receiver combination 610 may further comprise reverse optical transmitters RTX for transmitting information at wavelengths corresponding to the wavelengths received by upstream reverse optical receivers RRX at the head-end system 602 RRX.

Those having skill in the art will appreciate that there are various vehicles by which processes and/or systems described herein can be effected (e.g., hardware, software, and/or firmware), and that the preferred vehicle will vary with the context in which the processes are deployed. For example, if an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

In a general sense, those skilled in the art will recognize that the various aspects described herein which can be implemented, individually and/or collectively, by a wide range of hardware, software, firmware, or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of random access memory), and/or electrical circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. An optical communication system comprising:
   logic to communicate using optical channels all of which are set outside a fiber zero dispersion zone of approximately 20 nm wide in which a zero dispersion point for an optical fiber is located, and having adjacent channel spacing that decreases continuously with increasing distance from the fiber zero dispersion zone.

2. The optical communication system of claim 1, further comprising:
   channel spacing that decreases uniformly with increasing distance from the fiber zero dispersion zone.

3. The optical communication system of claim 1, further comprising:
   channel spacing that decreases non-uniformly with increasing distance from the fiber zero dispersion zone.

4. The optical communication system of claim 2, further comprising:
   channel spacing that decreases uniformly by one or 100 GHz, 50 GHz, and 25 GHz between each channel with increasing distance from the fiber zero dispersion zone.

5. The optical communication system of claim 1, further comprising:
   the optical channels all within a single CWDM band.

6. The optical communication system of claim 1, further comprising:
   the optical channels are centered on ITU grid values.

7. The optical communication system of claim 1, further comprising:
   four channels below the zero dispersion zone.

8. The optical communication system of claim 1, further comprising:
   four channels below the zero dispersion zone and four channels above the zero dispersion zone.

9. The optical communication system of claim 1, further comprising:
   four channels below the zero dispersion zone and eight channels above the zero dispersion zone.

10. The optical communication system of claim 1, further comprising:
    eight channels below the zero dispersion zone and four channels above the zero dispersion zone.

11. The optical communication system of claim 1, further comprising channel spacing set according to one of the following formulas:

$$F_i = F_0 + i \cdot df + 0.5 \cdot i^2 \cdot \Delta f$$

$$F_i = F_0 - i \cdot df - 0.5 \cdot i^2 \cdot \Delta f$$

where $F_0$ is the first selected wavelength, i is the channel index, df is the base-channel spacing (spacing of the channel closest to the zero dispersion zone) and $\Delta f$ is the increase in channel spacing between every pair of adjacent wavelengths.

12. An optical transmitter comprising:
    multiple lasers adapted to output light at a plurality of adjacent optical wavelengths each set outside a fiber zero dispersion zone of approximately 20 nm wide in which a zero dispersion point for an optical fiber is located, the spacing between adjacent wavelengths output by the lasers decreasing continuously with distance from the fiber zero dispersion zone.

13. The optical transmitter of claim 12, wherein the wavelength spacing decreases uniformly with increasing distance from the fiber zero dispersion zone.

14. The optical transmitter of claim 12, wherein the wherein the wavelength spacing decreases non-uniformly with increasing distance from the fiber zero dispersion zone.

15. The optical transmitter of claim 13, wherein the wavelength spacing decreases uniformly by one of 100 GHz, 50 GHz, and 25 GHz with increasing distance from the fiber zero dispersion zone.

16. The optical transmitter of claim 12, further comprising: the wavelengths are all within one CWDM band.

17. The optical transmitter of claim 12, further comprising: the wavelengths are centered on ITU grid values.

18. The optical transmitter of claim 12, further comprising: four lasers outputting wavelengths below the zero dispersion zone.

19. The optical transmitter of claim 12, further comprising: four lasers outputting wavelengths below the zero dispersion zone and four lasers outputting wavelengths above the zero dispersion zone.

20. The optical transmitter of claim 12, further comprising: four lasers outputting wavelengths below the zero dispersion zone and eight lasers outputting wavelengths above the zero dispersion zone.

21. The optical transmitter of claim 12, further comprising: eight channels below the zero dispersion zone and four channels above the zero dispersion zone.

22. The optical communication system of claim 12, further comprising channel spacing set according to one of the following formulas:

$$F_i = F_0 + i \cdot df + 0.5 \cdot i^2 \cdot \Delta f$$

$$F_i = F_0 - i \cdot df - 0.5 \cdot i^2 \cdot \Delta f$$

where $F_0$ is the first selected wavelength, i is the channel index, df is the base-channel spacing (spacing of the channel closest to the zero dispersion zone) and $\Delta f$ is the increase in channel spacing between every pair of adjacent wavelengths.

* * * * *